US011112967B2

(12) United States Patent
Liang et al.

(10) Patent No.: US 11,112,967 B2
(45) Date of Patent: Sep. 7, 2021

(54) METHOD AND APPARATUS FOR DISPLAYING USER INTERFACE, TERMINAL AND STORAGE MEDIUM

(71) Applicant: BEIJING XIAOMI MOBILE SOFTWARE CO., LTD., Beijing (CN)

(72) Inventors: Zhe Liang, Beijing (CN); Zhenzhou Lu, Beijing (CN); Xiaodong Li, Beijing (CN); Lan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/585,849

(22) Filed: Sep. 27, 2019

(65) Prior Publication Data
US 2020/0174661 A1 Jun. 4, 2020

(30) Foreign Application Priority Data

Nov. 30, 2018 (CN) .......................... 201811458286.2

(51) Int. Cl.
*G09G 5/00* (2006.01)
*G06F 3/0488* (2013.01)
(Continued)

(52) U.S. Cl.
CPC ........ *G06F 3/04886* (2013.01); *G06F 1/1616* (2013.01); *G06F 1/1641* (2013.01); *H04M 1/0214* (2013.01); *H04M 1/72448* (2021.01)

(58) Field of Classification Search
CPC .......... G06F 3/041; G06F 3/045; G06F 3/044; G06F 3/02; G06F 3/038; G06F 3/00; G09G 5/00; G06T 3/40
See application file for complete search history.

(56) References Cited

U.S. PATENT DOCUMENTS 10,379,573 B2 * 8/2019 Park ...................... G06F 1/1677
2007/0097014 A1 * 5/2007 Solomon ............... G06F 1/1616
345/1.1
(Continued)

FOREIGN PATENT DOCUMENTS

CN 103197879 A 7/2013
CN 103425243 A 12/2013
(Continued)

OTHER PUBLICATIONS

Chinese Office Action (including English translation) issued in CN201811458286.2, dated Apr. 9, 2020, 20 pages.
(Continued)

*Primary Examiner* — Pegeman Karimi
(74) *Attorney, Agent, or Firm* — Arch & Lake LLP

(57) ABSTRACT

A method and apparatus for displaying a user interface, a terminal, and a storage medium are provided in the field of human-computer interaction. The method includes: when a signal triggered by touching an identifier of the first program is received, starting a first application; when the folding display screen is in an open state, displaying the first application on a first screen area of the folding display screen; displaying a control area of the first application on a first partial area of the second screen area of the folding display screen; and displaying information of the second application on a second partial area of the second screen area.

20 Claims, 9 Drawing Sheets

(51) Int. Cl.
  *G06F 1/16* (2006.01)
  *H04M 1/02* (2006.01)
  *H04M 1/72448* (2021.01)

(56) References Cited

U.S. PATENT DOCUMENTS

| | | | |
|---|---|---|---|
| 2010/0182265 A1* | 7/2010 | Kim | G06F 1/1641 |
| | | | 345/173 |
| 2012/0192093 A1* | 7/2012 | Migos | G06F 3/04886 |
| | | | 715/773 |
| 2013/0024806 A1* | 1/2013 | Funabashi | A63F 13/426 |
| | | | 715/781 |
| 2013/0203469 A1 | 8/2013 | Cho | |
| 2013/0321264 A1* | 12/2013 | Park | G06F 3/002 |
| | | | 345/156 |
| 2014/0049464 A1 | 2/2014 | Kwak | |
| 2015/0141146 A1 | 5/2015 | Yoshihiro | |
| 2016/0085319 A1 | 3/2016 | Kim | |
| 2017/0333790 A1* | 11/2017 | Champy | A63F 13/77 |
| 2018/0025469 A1 | 1/2018 | Park | |
| 2018/0039387 A1* | 2/2018 | Cheong | G06F 3/0488 |
| 2018/0198896 A1 | 7/2018 | Kang | |

FOREIGN PATENT DOCUMENTS

| | | |
|---|---|---|
| CN | 103885592 A | 6/2014 |
| CN | 104904126 A | 9/2015 |
| CN | 105452983 A | 3/2016 |
| CN | 105843464 A | 8/2016 |
| CN | 103970443 B | 12/2017 |
| CN | 107688370 A | 2/2018 |
| CN | 107704177 A | 2/2018 |
| CN | 107765971 A | 3/2018 |
| CN | 108055572 A | 5/2018 |
| CN | 108255378 A | 7/2018 |
| CN | 108415752 A | 8/2018 |
| CN | 108459815 A | 8/2018 |
| CN | 108540646 A | 9/2018 |
| EP | 3322159 A1 | 5/2018 |

OTHER PUBLICATIONS

Extended European Search Report issued in EP19200199.8, dated Mar. 26, 2020, 9 pages.
Second Chinese Office Action issued in Chinese Application No. 201811458286.2, dated Nov. 2, 2020 with English translation (23p).
Chinese Notice of Allowance (including English translation) issued in CN201811458286.2, dated Mar. 10, 2021, 6 pages.

* cited by examiner

METHOD AND APPARATUS FOR DISPLAYING USER INTERFACE, TERMINAL AND STORAGE MEDIUM

CROSS-REFERENCE TO RELATED APPLICATION

This application is based upon and claims priority to Chinese Patent Application No. 201811458286.2, filed on Nov. 30, 2018, the entire contents thereof are incorporated herein by reference.

TECHNICAL FIELD

The present disclosure relates to the field of human-computer interaction, and in particular, to a method and apparatus for displaying a user interface, a terminal, and a storage medium.

BACKGROUND

The touch display screen is a part of the terminal for displaying a user interface (UI), and the flexible touch display screen may be realized as a folding display screen.

A terminal with a folding display screen may be in a folded state or an open state. When being in the folded state, the folding display screen may be folded outward into a U shape; and when being in the open state, two-screen areas on the folding display screen may be expanded into the same plane or a V shape with a certain angle.

In the related art, when the folding display screen is in the open state, and the terminal starts and runs a first application, a user interface of the first application is displayed on a first screen area of the folding display screen, and a second display area of the folding display screen is usually displayed as blank or in a turning-off state; and when the terminal receives a push message sent by other application, the push message is displayed in the first screen area.

SUMMARY

The embodiments of the present disclosure provide a method and apparatus for displaying a user interface, a terminal, and a storage medium to reduce the wasting of screen resources caused by displaying the second screen area as blank or turning off the screen when the terminal having the folding display screen runs the first application in the related art.

According to a first aspect of the present disclosure, there is provided a method for displaying a user interface, applied in a terminal having a folding display screen, the folding display screen including two foldable screen areas, and the method including: when a signal triggered by touching an identifier of a first program is received, starting a first application; when the folding display screen is in an open state, displaying a display area of the first application on a first screen area of the folding display screen; displaying a control area of the first application on a first partial area of a second screen area of the folding display screen; and displaying the information of the second application on a second partial area of the second screen area.

According to a second aspect of the present disclosure, the embodiments of the present disclosure provide an apparatus for displaying a user interface, applied to a terminal having a folding display screen, the folding display screen including two foldable screen areas, and the apparatus including: a processing module configured to, when a signal triggered by touching an identifier of a first program is received, start a first application; and a display module configured to, when the folding display screen is in an open state, display a display area of the first application on a first screen area of the folding display screen; display a control area of the first application on a first partial area of a second screen area of the folding display screen; and display information of a second application on a second partial area of the second screen area.

According to a third aspect of the present disclosure, the embodiments of the present disclosure provide a terminal, including a processor and a memory, wherein the memory stores at least one instruction, and the instruction is loaded and executed by the processor to implement the method mentioned above for displaying the user interface.

According to a fourth aspect of the present disclosure, the embodiments of the present disclosure provide a computer-readable storage medium, wherein the storage medium stores at least one instruction, and the instruction is loaded and executed by a processor to implement the method mentioned above for displaying the user interface.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

The terminology used in the present disclosure is for the purpose of describing particular embodiments only and is not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first", "second", "third", etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
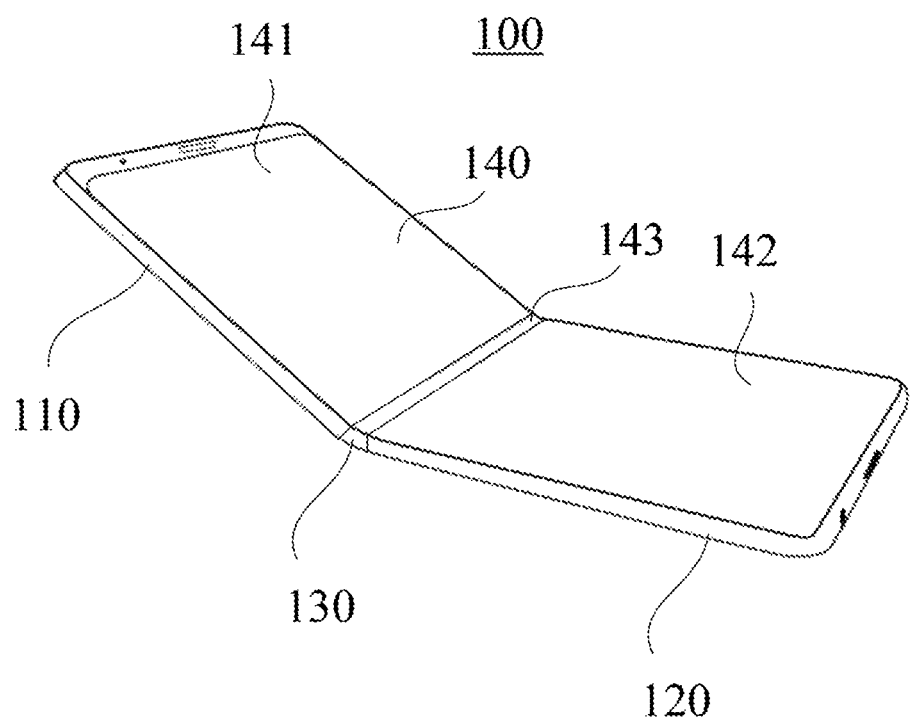
FIG. 1 is a block diagram of a terminal having a folding display screen according to an example embodiment.

FIG. 1 is a block diagram showing a structure of a terminal having a folding display screen according to an example embodiment. As shown in FIG. 1, the terminal 100 includes a first housing 110, a second housing 120, a connection assembly 130 connecting the first housing 110 and the second housing 120, and a folding display screen 140. The folding display screen 140 extends from the first housing 110 to the second housing 120. The first housing 110 and the second housing 120 are flipped and folded by the connection assembly 130, and the folding display screen 140 is a touch panel display screen.

The folding display screen 140 includes a first screen area 141, a second screen area 142, and a third screen area 143. The first screen display area 141 is fixedly connected to the first housing 110, the second screen display area 142 is fixedly connected to the second housing 120, and the third screen area 143 corresponds to a position of the connection assembly 130.

The folding display screen 140 may be folded and flipped using the following structures: (1) the first screen area 141, the second screen area 142, and the third screen area 143 are all made of a flexible material with a certain degree of expansion and contraction; (2) the third screen area 143 is made of a flexible material, and the first screen area 141 and the second screen area 142 are made of a non-flexible material.

Figure 2:
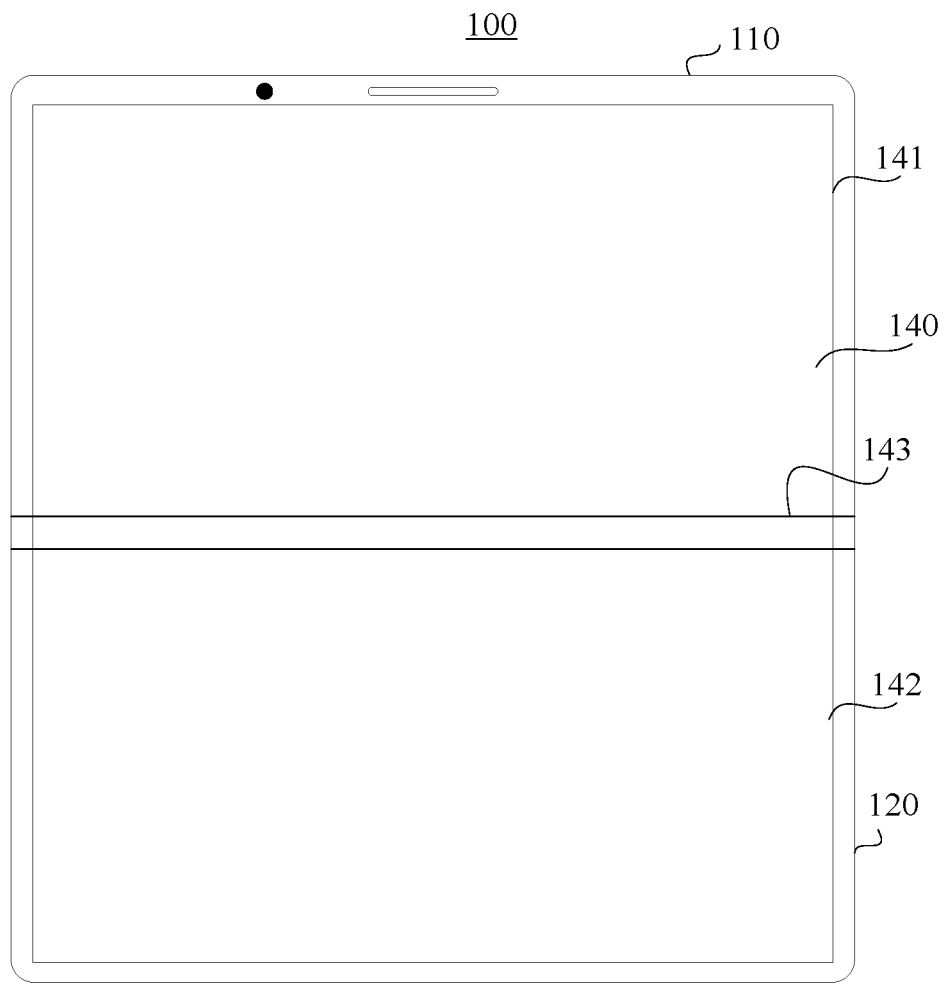
FIG. 2 is a block diagram of an open state of the terminal having a folding display screen according to an example embodiment.
Figure 3:
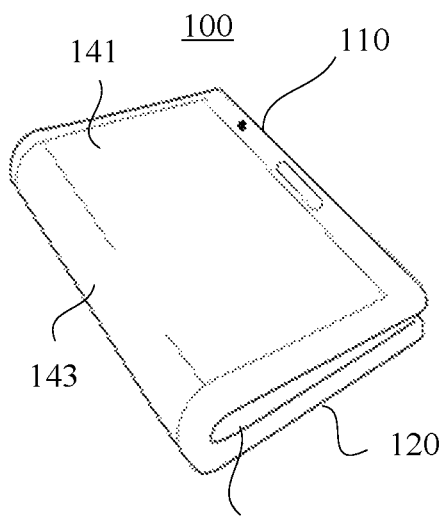
FIG. 3 is a block diagram of an outward-folded state of the terminal having a folding display screen according to an example embodiment.

The folding display screen 140 may be in an open state and a folded state. FIG. 2 is a block diagram showing a structure of a terminal in an open state. As shown in FIG. 2, the user may expand the folding display screen 140 by holding the first housing 110 and the second housing 120 to make the folding display screen 140 in the open state (note that in the open state, the two-screen areas on the folding display screen may be expanded to be the same plane or to be a V shape with a certain angle). FIG. 3 is a block diagram showing a structure of a terminal in a folded state, more specifically an outward-folded state. As shown in FIG. 3, the user may close the folding display screen 140 by holding the first housing 110 and the second housing 120 to make the folding display screen 140 in the folded state.

Figure 4:
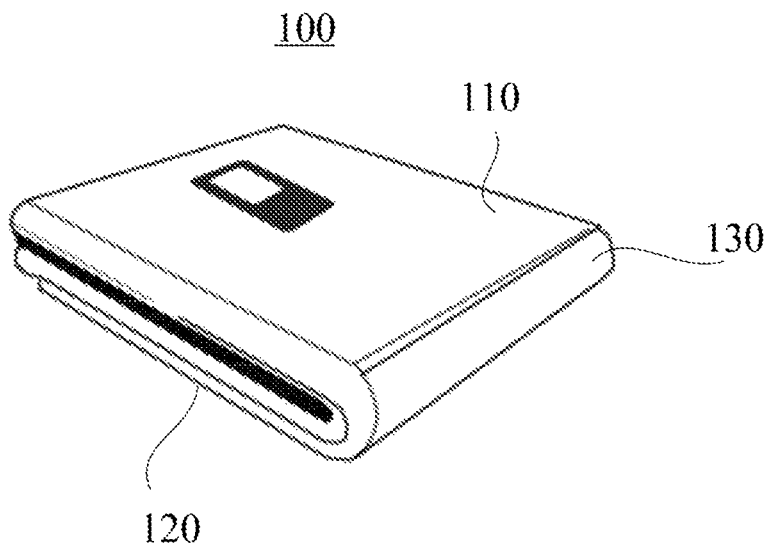
FIG. 4 is a block diagram of an inward-folded state of the terminal having a folding display screen according to an example embodiment.

The folded state further includes an outward-folded state and an inward-folded state. As shown in FIG. 3, the outward-folded state is a folded state in which the folding display screen 140 is displayed outwards. FIG. 4 is a block diagram showing a structure of a terminal in a folded state, more specifically an inward-folded state. As shown in FIG. 4, the inward-folded state is a folded state in which all or a part of the folding display screen 140 is accommodated inside. In this embodiment, the folded state of the folding display screen 140 may include an outward-folded state and an inward-folded state; or, the folded state of the folding display screen 140 includes only the inward-folded state; or, the folded state of the folding display screen 140 includes only the outward-folded state.

Figure 5:
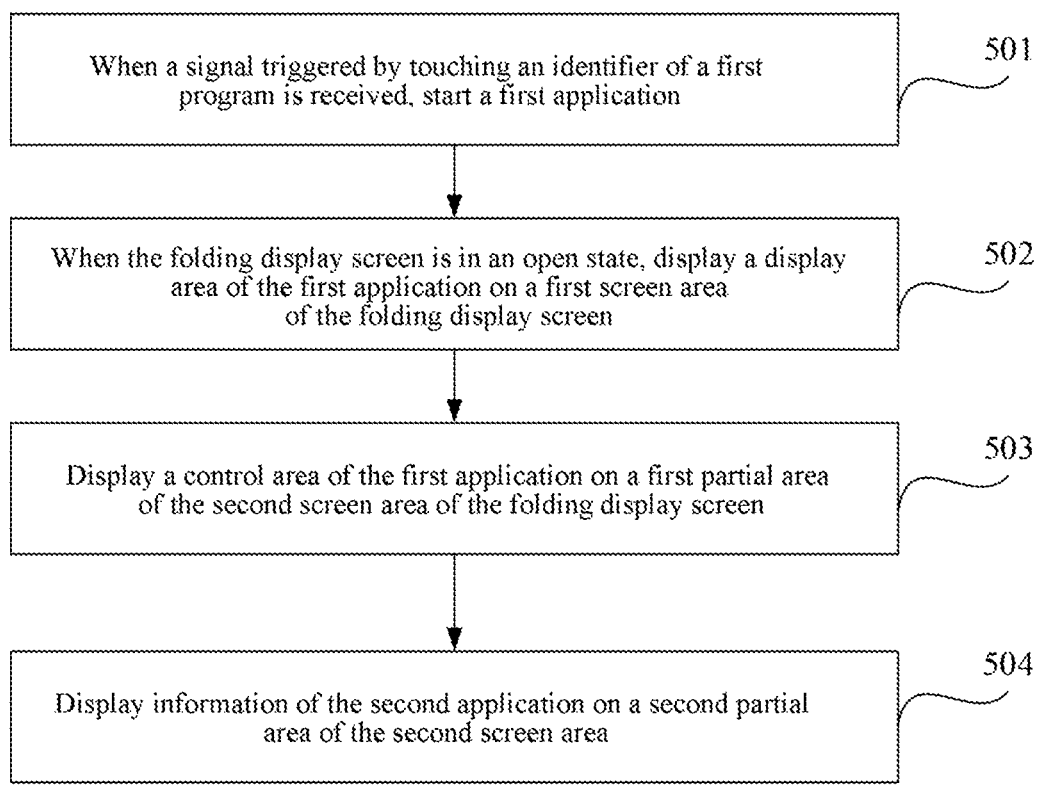
FIG. 5 is a flowchart of a method for displaying a user interface according to an example embodiment.

FIG. 5 is a flow chart showing a method for displaying a user interface according to an example embodiment. The method may be performed by the terminal 100 in FIGS. 1 to 4, and the method includes the following steps:

In step 501, when a signal triggered by touching an identifier of a first program is received, a first application starts.

For example, when the terminal is in an open state, a desktop of an operating system of the terminal is displayed on the folding display screen, and the identifier of at least one application is displayed on the desktop of the operating system. When the user touches the identifier of the first application in the application to trigger the signal, the terminal starts the first application.

In another example, when the terminal is in the outward-folded state, the desktop of the operating system of the terminal is displayed on the first screen area and the second screen area of the folding display screen, and the identifier of at least one application is displayed on the desktop of the operating system. When the user touches the identifier of the first application in the application to trigger the signal, the terminal starts the first application.

In the embodiments of the present disclosure, the application may be an application of the system or an application provided by a third-party. A system application is an application provided by a vendor that provides an operating system (such as a shooting application, a call application, a short message application, etc.), and the application provided by the third-party refers to an application provided by a third-party vendor other than the vendor that provides the operating system (such as an instant messaging application, a gaming application, a social application, etc.).

In step 502, when the folding display screen is in an open state, a display area of the first application is displayed on a first screen area of the folding display screen.

The terminal monitors whether the folding display screen is in the open state, and when the folding display screen is in the open state, the display area of the first application is displayed in the first screen area.

For example, the first application is a preset application, which includes a display area and a control area. The display area is used to display a display screen of the first application, and the control area is used to display a control identifier of the first application.

In another example, the first application is an application of a virtual environment, and a screen of the virtual environment is displayed in the display area, and the virtual environment includes at least one controllable virtual object; or the first application is an editing application (an image editing application, an audio editing application, or the like), and an editing interface is displayed in the display area; or, the first application is a text processing application, and text information to be processed is displayed in the display area.

In step 503, the control area of the first application is displayed in a first partial area of the second screen area of the folding display screen.

The second screen area includes a first partial area and a second partial area, and the first partial area displays the control area of the first application. For example, when the first application is an application of the virtual environment, the control area displays a control identifier for controlling the virtual object in the virtual environment; when the first application is the editing application, the control area displays an edit control for editing an image or audio; and when the first application is the text processing application, the control area displays an edit control for editing a text file, such as a virtual keyboard.

Figure 6:
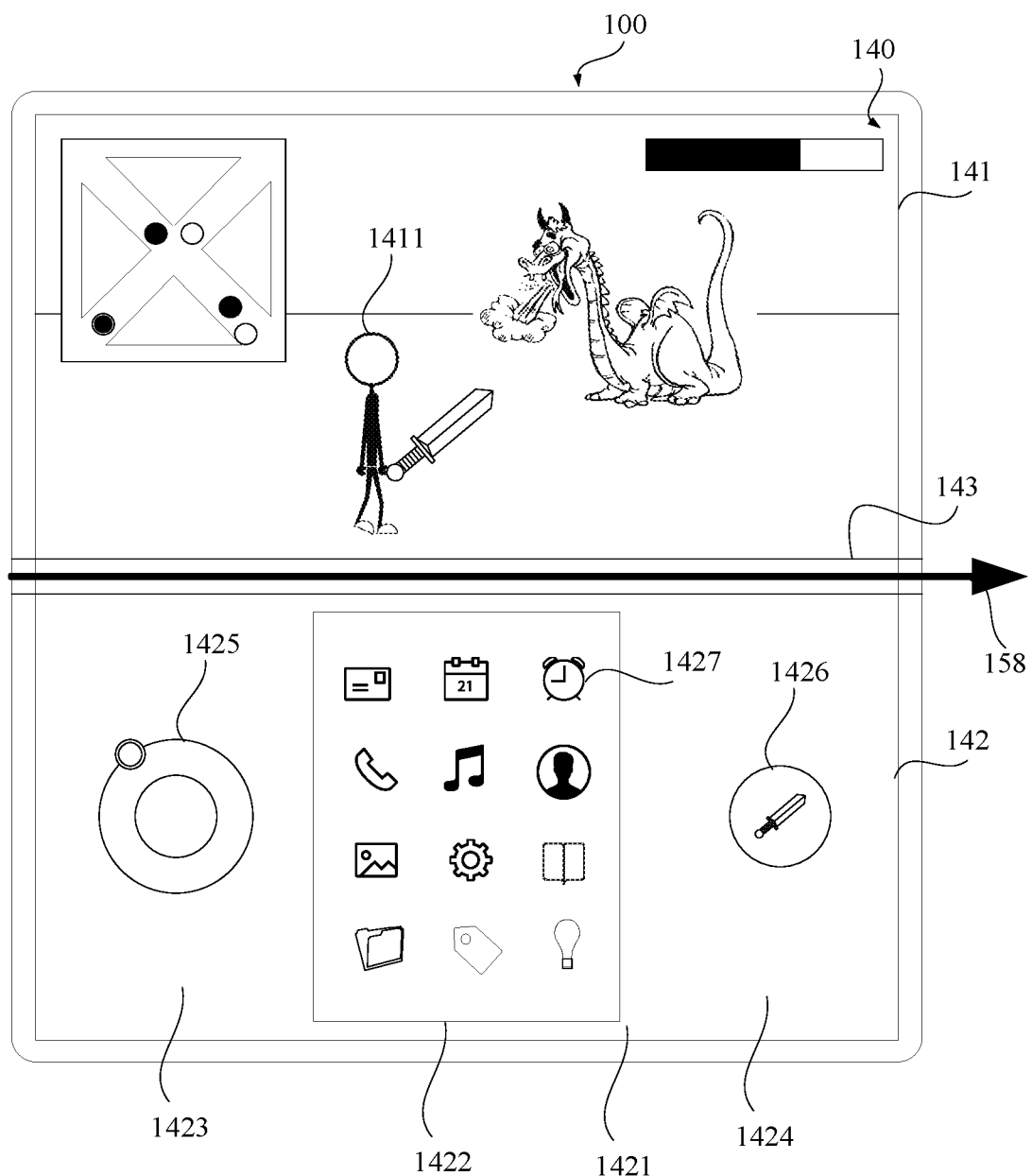
FIG. 6 is a block diagram of a user interface according to an example embodiment.

For example, the first application is an application of a virtual environment, as shown in FIG. 6, the folding display screen 140 includes a first screen area 141, a second screen area 142, and a third screen area 143 connecting the first screen area 141 and the second screen area 142. The third screen area 143 is a long and narrow rectangle.

The first screen area 141 displays a screen of the virtual environment, and the screen includes the virtual environment and a virtual object 1411 located in the virtual environment.

The second screen area 142 includes a first partial area 1421 and a second partial area 1422. A first control sub-area 1423 and a second control sub-area 1424 are displayed in the first partial area 1421. In a length direction 158 of the third screen area 143 (a direction of an arrow in FIG. 6), the second screen area 142 sequentially displays the first control sub-area 1423, the second partial area 1422, and the second control sub-area 1424. For example, the length direction 158 may refer to a direction along the longer edge of the third screen area 143.

The first control sub-area 1423 displays a direction control identifier 1425 that controls a moving direction of the virtual object 1411, and the second control sub-area 1424 displays a behavior function control identifier 1426 that controls the virtual object 1411.

In step 504, information of the second application is displayed in a second partial area of the second screen area.

The terminal displays the information of the second application in the second partial area. The second application is an application other than the first application among the applications installed by the terminal. For example, the information of the second application includes an identifier of the second application, information pushed by the second application, a user interface of the second application, and the like.

For example, as shown in FIG. 6, an identifier 1427 of the second application is displayed in the second partial area of the second screen area 142.

Some embodiments may allow, by displaying the display area of the first application on the first screen area of the folding display screen, displaying the control area of the first application on the first partial area of the second screen area of the folding display screen, and displaying the information of the second application on the second partial area of the second screen area, a reduction in the waste of screen resources caused by displaying the second screen area as blank or turning off the screen during running of the first application in the related art can be achieved, and because the terminal displays the information of the second application on the basis of not affecting the operation of the first application while running the first application, the control convenience of the terminal is improved.

Figure 7:
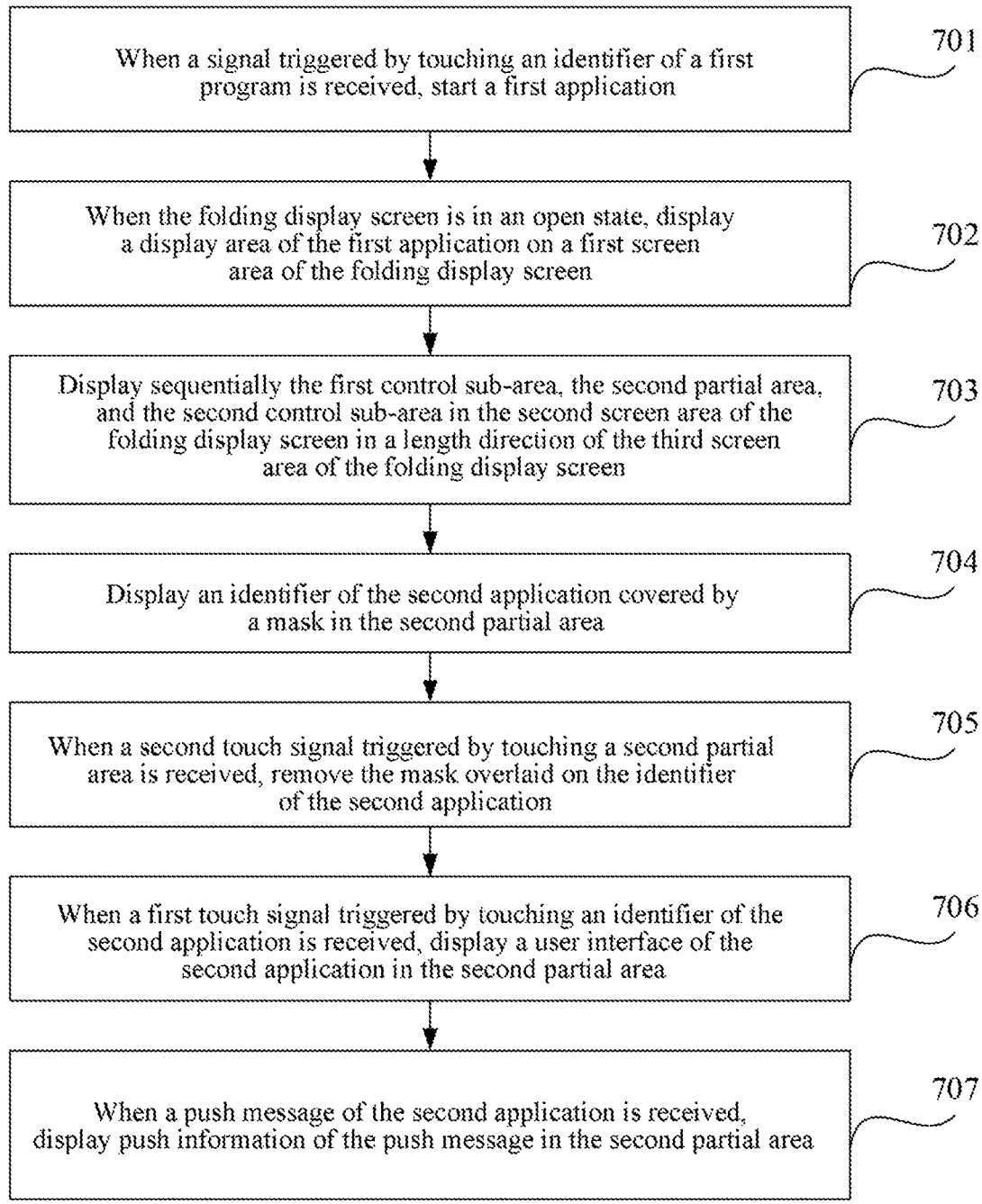
FIG. 7 is a flowchart of a method for displaying a user interface according to an example embodiment.

FIG. 7 is a flow chart showing a method for displaying a user interface according to an example embodiment. The method may be performed by the terminal 100 in FIGS. 1 to 4, and the method includes the following steps:

In step 701, when a signal triggered by touching an identifier of a first program is received, a first application starts.

For the method for the terminal to start the first application, reference may be made to step 501 described above in an embodiment of FIG. 5.

In step 702, when the folding display screen is in an open state, a display area of the first application is displayed on a first screen area of the folding display screen.

The terminal monitors whether the folding display screen is in the open state, and when the folding display screen is in the open state, the display area of the first application is displayed on the first screen area.

For example, the first application is a preset application, which includes a display area and a control area. The display area is used to display a display screen of the first application, and the control area is used to display a control identifier of the first application.

The user may set the first application through an editing interface, or an identifier set of the first application is pre-stored in the terminal, and when the application starts, detection of whether the identifier of the application is in the identifier set, and if the identifier of the application is in the identifier set, the application is determined to be the first application.

In another example, the first application is an application of the virtual environment, and the display area displays a screen of the virtual environment, where the virtual environment includes at least one controllable virtual object.

In step 703, the first control sub-area, the second partial area, and the second control sub-area are sequentially displayed in the second screen area of the folding display screen in a length direction of the third screen area of the folding display screen.

Figures 8A, 8B:
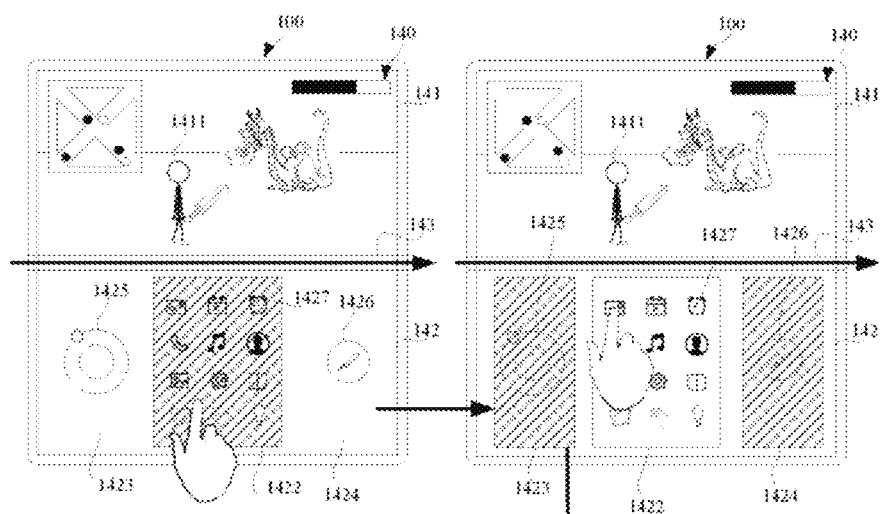
FIG. 8A is a block diagram of a user interface according to an example embodiment.
FIG. 8B is a block diagram of a user interface according to an example embodiment.
Figure 8C:
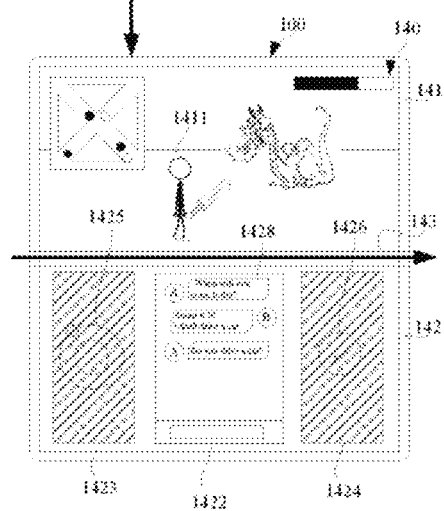
FIG. 8C is a block diagram of a user interface according to an example embodiment.

FIG. 8A, FIG. 8B, and FIG. 8C are a series of block diagrams showing how a user could interact with a user interface on terminal 100. As shown in FIG. 8A, the folding display screen 140 includes a first screen area 141, a second screen area 142, and a third screen area 143 that connects the first screen area 141 and the second screen area 142. The third screen area 143 is a long and narrow rectangle.

The first screen area 141 displays a picture of a virtual environment, and the picture includes the virtual environment and a virtual object 1411 located in the virtual environment.

The second screen area 142 includes a first partial area 1421 and a second partial area 1422. A first control sub-area 1423 and a second control sub-area 1424 is displayed in the first partial area 1421. In a length direction 158 of the third screen area 143 (a direction of an arrow in FIG. 6), the second screen area 142 sequentially displays the first control sub-area 1423, the second partial area 1422, and the second control sub-area 1424.

The first control sub-area 1423 displays a direction control identifier 1425 that controls a moving direction of the virtual object 1411, and the second control sub-area 1424 displays a behavior function control identifier 1426 that controls the virtual object 1411.

In step 704, an identifier of the second application covered by a mask is displayed in the second partial area.

Illustratively, as shown in FIG. 8A, an identifier 1427 of the second application covered by a mask (a shaded area) is displayed in the second partial area 1422. When the user operates the virtual object by touching the first control sub-area 1423 and the second control sub-area 1424, the identifier of the second application displayed in the second partial area 1422 may give a visual impact to the user on touching the first control sub-area 1423 and the second control sub-area 1424, therefore, by overlaying the mask on the second partial area 1422, a brightness of the identifier of the second application can be reduced, the visual impact on using the first application by the user caused by the identifier 1427 of the second application is reduced, and the operating convenience of the terminal is improved.

In step 705, when a second touch signal triggered by touching a second partial area is received, the mask overlaid on the identifier of the second application is removed.

Illustratively, as shown in FIG. 8B, when the terminal receives the second touch signal triggered by the user touching the second partial area 1422, the mask covering the second partial area 1422 is removed, thus the identifier 1427 of the second application in the second partial area 1422 is displayed as normal brightness, so that the user can conveniently select to touch the identifier 1427 of the second application in the second partial area 1422.

For example, as shown in FIG. 8B, when the terminal receives the second touch signal triggered by the user touching the second partial area 1422, the terminal covers the mask on the first control sub-area 1423 and the second control sub-area 1424 to reduce the brightness of the direction control indicator 1425 and the function control identifier 1426, thereby reducing the visual impact on the user touching the identifier 1427 of the second application caused by the direction control identifier 1425 and the function control identifier 1426, and improving the operating convenience of the terminal.

In step 706, when a first touch signal triggered by touching an identifier of the second application is received, a user interface of the second application is displayed in the second partial area.

For example, as shown in FIG. 8C, when the terminal receives the first touch signal triggered by touching the identifier 1427 of the second application by the user, a user interface 1428 of the application is displayed in the second partial area 1422.

In step 707, when a push message of the second application is received, push information of the push message is displayed in the second partial area.

The push information includes at least one of a message notification of the push message, a message preview of the push message, and a user interface of the second application. The message notification is notification information for indicating that the push message is received, and the message preview is preview information of the push message.

Figures 9A, 9B:
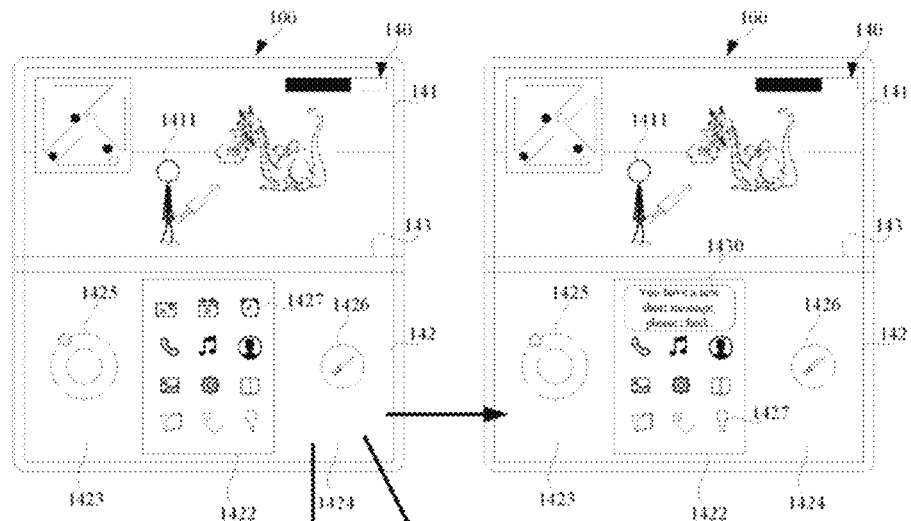
FIG. 9A is a block diagram of a user interface according to an example embodiment.
FIG. 9B is a block diagram of a user interface according to an example embodiment.
Figures 9C, 9D:
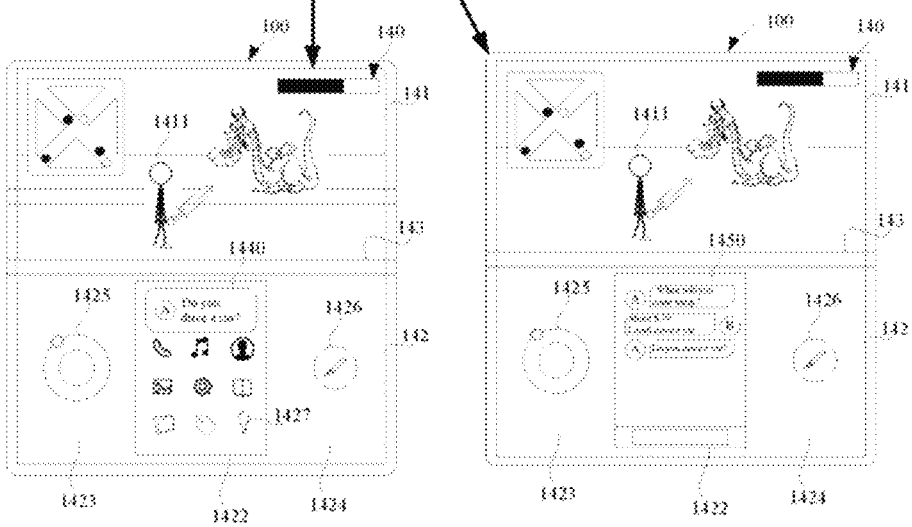
FIG. 9C is a block diagram of a user interface according to an example embodiment.
FIG. 9D is a block diagram of a user interface according to an example embodiment.

FIG. 9A illustrates a terminal 100 having a folding display screen 140 with a user interface before a push message of the second application is received. For example, the second application is a short message application. In an implementation manner, as shown in FIG. 9B, when the terminal receives a short message, a message notification 1430 of the short message is displayed in the second partial area 1422. In another implementation manner, as shown in FIG. 9C, when the terminal receives the short message, a message preview 1440 of the short message is displayed in the second partial area 1422. In another implementation manner, as shown in FIG. 9D, when the terminal receives the short message, a user interface 1450 of the short message application is displayed in the second partial area 1422.

Some embodiments may allow, by displaying the display area of the first application on the first screen area of the folding display screen, displaying the control area of the first application on the first partial area of the second screen area of the folding display screen, and displaying the information of the second application on the second partial area of the second screen area, a reduction in the waste of screen resources caused by displaying the second screen area as blank or turning off the screen during running of the first application in the related art can be achieved, and because the terminal displays the information of the second application on the basis of not affecting the operation of the first application while running the first application, the control convenience of the terminal is improved.

For example, in the embodiments of the present disclosure, when the terminal is running the first application, by reducing the brightness of the identifier of the second application by covering the mask on the second partial area, the visual impact on the user touching the identifier of the second application caused by the direction control identifier and the function control identifier is reduced, thereby improving the convenience of operating the terminal.

In another example, in the embodiments of the present disclosure, when the second touch signal triggered by touching the second partial area by the user is received, the terminal covers the mask on the first control sub-area and the second control sub-area, so as to reduce the brightness of the control identifier and the function control identifier, thereby reducing the visual impact on the user touching the identifier of the second application caused by the direction control identifier and the function control identifier, and improving the convenience of operating the terminal.

In the embodiments of the present disclosure, the information of the second application may be information of the application displayed on the desktop of the operating system of the terminal, or information of the application other than the first application in the terminal, or information of an application that has run recently among other applications, or information about a commonly used application that the user frequently uses among other applications.

Figure 10:
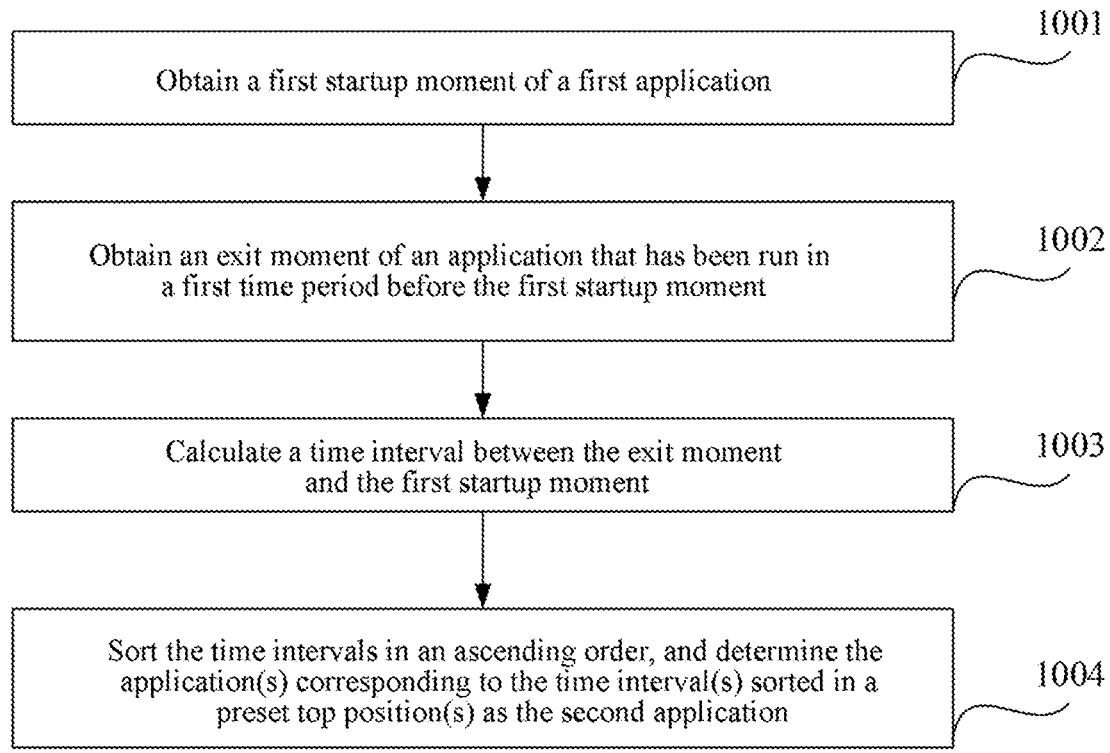
FIG. 10 is a flowchart of a method for obtaining a second application according to an example embodiment.

FIG. 10 is a flowchart of a method for a terminal to obtain a second application, which may be a method before step 504 in the embodiment of FIG. 5, and may be performed by the terminal 100 in the embodiments of FIGS. 1-4. The second application in this embodiment is the most recently run application among other applications. The method includes the following steps:

In step 1001, a first startup moment of a first application is obtained.

For example, the terminal may obtain a first startup moment t0 of the first application started last time by querying a log file stored in the operating system.

In step 1002, an exit moment of an application that has run in a first time period before the first startup moment is obtained.

For example, the first time period T1 is a preset time period in the terminal, and the terminal may obtain the exit moment of the application running between (t0-T1) moment and t0 moment by querying the log file stored in the system.

In step 1003, a time interval between the exit moment and the first startup moment is calculated.

For example, the terminal acquires applications that have run between (t0-T1) moment and t0 moment as an application 1, an application 2, and an application 3, and the application 1, the application 2, and the application 3 respectively have the exit moments of t1, t2, and t3. The terminal calculates and obtains a time interval ΔT1 between t1 and t0, a time interval between t2 and t0, and a time interval ΔT3 between t3 and t0.

In step 1004, the time intervals are sorted in ascending order, and the application corresponding to the time interval sorted in top preset position(s) is determined as the second application.

For example, after the terminal calculates ΔT1, ΔT2, and ΔT3, if ΔT3>ΔT1>ΔT2, then ΔT1,ΔT2, and ΔT3 are sorted in order from smallest to large: ΔT2, ΔT1, ΔT3; if the preset position number is 2, then the application 2 corresponding to ΔT2 and the application 1 corresponding to ΔT1 are the second application, and the terminal displays the identifier information of the application 1 and the application 2 in a first window. For example, the identifier information of the second application displayed in the first window is an icon of the second application.

Some embodiments may allow, by acquiring the first startup moment of the first application, acquiring the applications that have run in the first time period before the first startup moment, and calculating and obtaining a preset number of applications with the exit moments near to the first startup moment, the second application is obtained, so that the information of the application that the user has recently used is displayed in the second partial area, which improves the convenience of operating the terminal.

Figure 11:
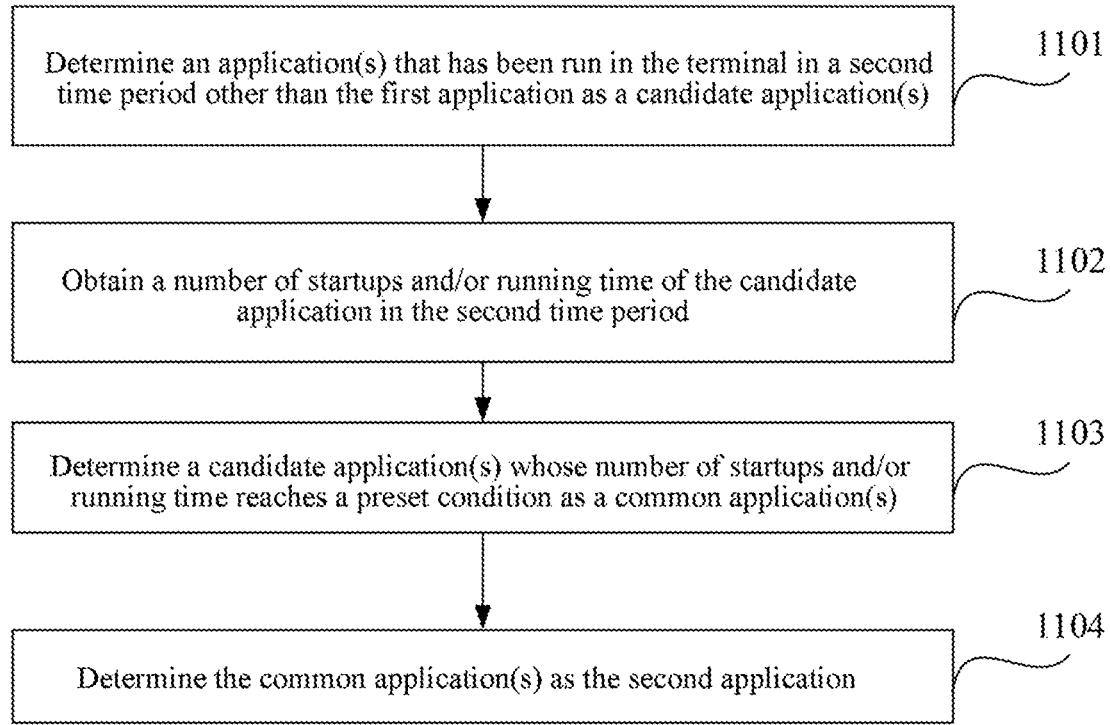
FIG. 11 is a flowchart of a method for obtaining a second application according to an example embodiment.

FIG. 11 is a flow chart showing a method for obtaining a second application by a terminal, which may be a method before step 504 in the embodiment of FIG. 5 and may be performed by the terminal 100 in the embodiment of FIGS. 1-4. The second application in this embodiment is the information of a common application frequently used by the user among other applications. The method includes the following steps:

In step 1101, an application(s) that have run in the terminal in a second time period other than the first application is determined as a candidate application(s).

The second time period is preset in the terminal. For example, the terminal acquires, as a candidate application, an application other than the first application that has run within 24 hours, where the second time period is 24 hours.

In step 1102, several startups and running time of the candidate application in the second time period is obtained.

The terminal acquires the number of startups and the running time of the candidate application in the second time period.

In step 1103, a candidate application(s) whose number of startups and running time reaches a preset condition is determined as a common application(s).

For example, the terminal sorts the number of starts in descending order, and determines a candidate application(s) corresponding to the number of startups sorted in top preset position(s) as a common application.

In another example, the terminal obtains that the number of startups of the candidate application 1 in the second time period is n1, the number of startups of the candidate application 2 in the second time period is n2, and the number of startups of the candidate application 3 in the second time period is n3, if n3>n1>n2 and the preset position number is 2, it is determined that the candidate application 3 and the candidate application 1 are the common applications.

In another example, the terminal sorts the running time in order from long to short, and determines a candidate application(s) corresponding to the running time sorted in top preset position(s) as a common application.

In another example, the terminal obtains that the running time of the candidate application 1 in the second time period is Δt1, the running time of the candidate application 2 in the second time period is Δt2, and the running time of the candidate application 3 in the second time period is Δt3, if Δt3>Δt1>Δt2 and the preset position number is 2, it is determined that the candidate application 3 and the candidate application 1 are the common applications.

In another example, for any candidate application in the candidate applications, the terminal multiplies the number of startups by a first weight value, and multiplies the running time by a second weight value, so as to obtain a first score value of each candidate application; and sorts the first score values in descending order, and determines the candidate application(s) corresponding to the score value(s) ranked at top preset position(s) as the common applications.

The second score value is used to indicate a frequency of use of the application, and the higher the second score value is, the higher the frequency of use of the application is.

For example, the terminal obtains that the number of startups of the candidate application 1 in the second time period is n1, the running time is Δt1, and the first score of the candidate application 1 is calculated as S1=(n1*q1+Δt1*q2); the number of startups of the candidate application 2 in the second time period is n2, the running time is Δt2, and the first score S2 of the candidate application 2 is calculated as S2=(n2*q1+Δt2*q2); the number of startups of the candidate application 3 in the second time period is n3, the running time is Δt3, and the first score of the candidate application 3 is calculated as S3=(n3*q1+Δt3*q2), where q1 is the first weight value, and q2 is the second weight value, if S3>S1>S2, and the preset position number is 2, then it is determined that the candidate application 3 and the candidate application 1 are the common applications.

In step 1104, the common application(s) is determined as the second application.

The terminal determines the common application obtained in step 903 as the second application.

Some embodiments may allow, by acquiring applications other than the first application that have run in the second time period as candidate applications, acquiring the number of times of running and/or the running time the candidate application runs in the second time period, obtaining the commonly used application in the candidate applications by calculation according to the number of times of running and/or the running time, and determining the common application as the second application, the information of the common application is displayed in the second partial area, thereby improving the control convenience of the terminal.

For example, in the embodiments of the present disclosure, by multiplying the obtained number of times of running and running time of the candidate application in the second time period by corresponding weight values respectively to obtain the first score of each candidate application, and determining the candidate application(s) ranked in the preset position to be the common application according to the order of the first score from large to small, the accuracy of obtaining the commonly used application is improved.

Figure 12:
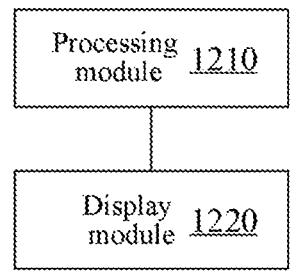
FIG. 12 is a block diagram of an apparatus for displaying a user interface according to an example embodiment.

FIG. 12 is a block diagram showing a structure of an apparatus for displaying an interface according to an example embodiment. The apparatus may be implemented as the terminal 100 in the embodiments of FIGS. 1-4 by software, hardware or a combination thereof. The apparatus includes a processing module 1210 and a display module 1220.

The processing module 1210 is configured to, when a signal triggered by touching an identifier of a first program is received, start a first application.

The display module 1220 is configured to, when the folding display screen is in an open state, display a display area of the first application on a first screen area of the folding display screen; display a control area of the first application on a first partial area in a second screen area of the folding display screen; and display information of a second application on a second partial area of the second screen area.

For example, the first screen area and the second screen area are connected by the third screen area; the control area includes a first control sub-area and a second control sub-area; and the second screen area sequentially displays the first control sub-area, the second partial area, and the second control sub-area along a length direction of the third screen area.

In another example, the first application is an application of a virtual environment, a screen of the virtual environment is displayed in the display area, and the virtual environment includes at least one virtual object; a direction control identifier is displayed in the first control sub-area, and the direction control identifier is used to control a moving direction of the virtual object; and a function control identifier is displayed in the second control sub-area, and the function control identifier is used to control the behavior of the virtual object.

In another example, the information of the second application includes an identifier of the second application; and the display module 1220 is further configured to, when a first touch signal triggered by touching an identifier of the second application is received, display a second user interface in the second partial area, where the second user interface is a user interface of the second application.

In another example, the information of the second application includes an identifier of the second application; and the display module 1220 is further configured to display the identifier of the second application covered by a mask on the second partial area; and when a second touch signal triggered by touching the second partial area is received, remove the mask, and display the identifier of the second application.

In another example, the display module 1220 is further configured to add a mask to the control area.

In another example, the information of the second application includes push information of the second application; and the display module 1220 is further configured to, when a push message of the second application is received, display the push information on the second partial area, the push information including at least one of a message notification of the push message, a message preview of the push message, and a user interface of the second application.

In another example, the information of the second program is the information of the application displayed on a desktop of an operating system of the terminal.

In another example, the processing module 1210 is further configured to acquire a first startup moment of the first application, and determine an application that has run in a first time period before the first startup moment as the second application.

In another example, the processing module 1210 is further configured to: acquire exit moments of the applications that have run in the first time period before the first startup moment; calculate time intervals between the exit moments and the first startup moment; and sort the time intervals in ascending order, and determine an application corresponding to the time interval(s) sorted in top preset position(s) as the second application.

In another example, the processing module 1210 is further configured to determine, among the applications that have run in the terminal in a second time period, applications other than the first application as candidate applications; acquiring numbers of startups and/or running time of the candidate applications in the second time period; determining the candidate application whose number of startups and/or running time reaches a preset condition as a common application; and determining the common application as the second application.

Figure 13:
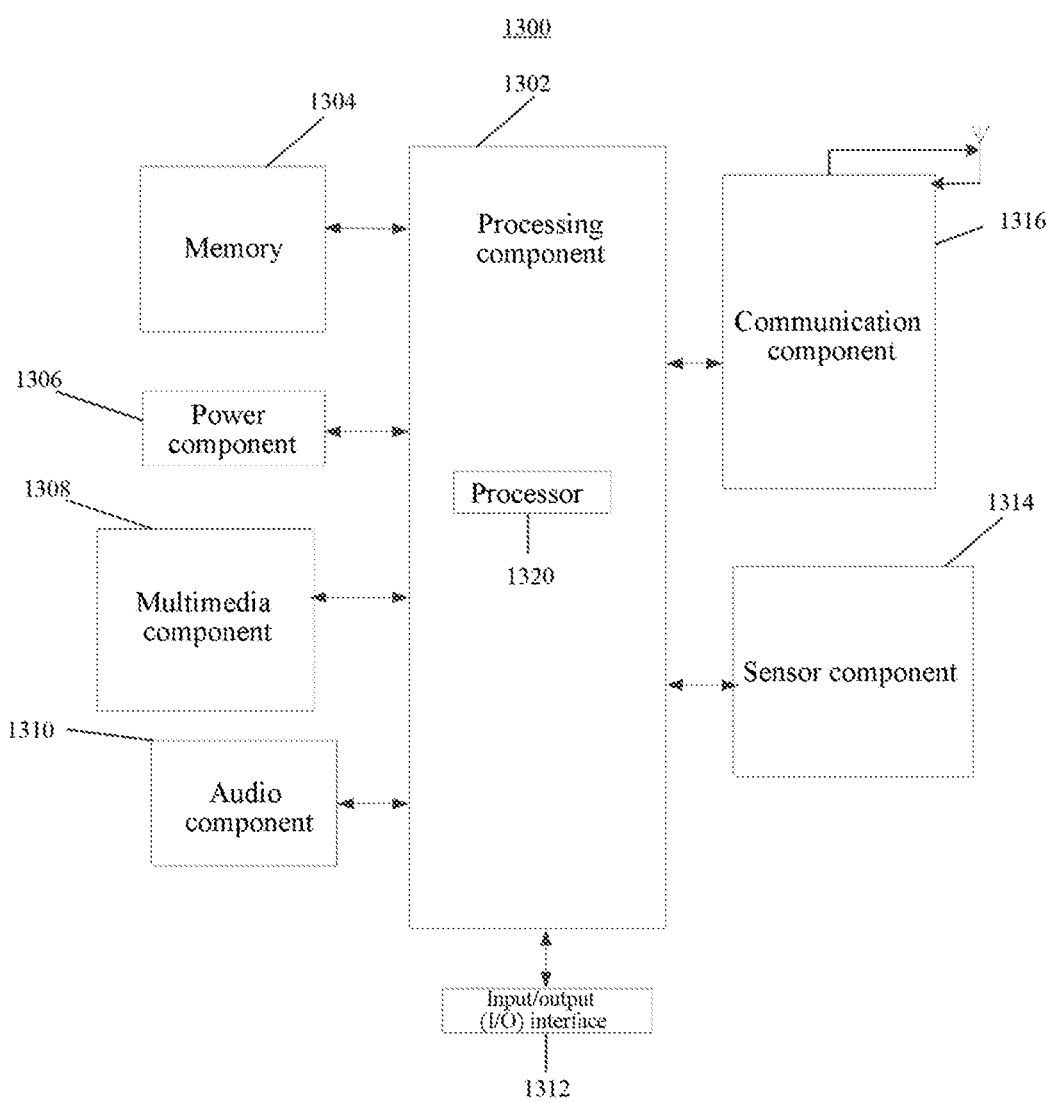
FIG. 13 is a block diagram of a terminal according to an example embodiment.

FIG. 13 is a block diagram of a terminal 1300 according to an example embodiment. For example, the apparatus 1700 may be a mobile phone, a computer, a digital broadcast terminal, a messaging device, a gaming console, a tablet, a medical device, exercise equipment, a personal digital assistant, and the like.

Referring to FIG. 13, the terminal 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the terminal 1300, such as the operations associated with the display, telephone calls, data communications, camera operations, and recording operations. The processing component 1302 may include one or more processors 1720 to execute instructions to perform all or part of the steps in the above-described methods. Moreover, the processing component 1302 may include one or more modules that facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the terminal 1300. Examples of such data include instructions for any applications or methods operated on the terminal 1300, contact data, phonebook data, messages, pictures, video, etc. The memory 1304 may be implemented using any volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the terminal 1300. The power component 1306 may include a power management system, one or more power sources, and any other components associated with the generation, management, and distribution of power in the terminal 1300.

The multimedia component 1308 includes a screen providing an output interface between the terminal 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action but also sense a period of time and a pressure associated with the touch or swipe action. In some embodiments, the multimedia component 1308 includes a front camera and a rear camera. The front camera and the rear camera may receive an external multimedia datum while the terminal 1300 is in an operation mode, such as a photographing mode or a video mode. Each of the front camera and the rear camera may be a fixed optical lens system or have focus and optical zoom capability.

The audio component 1310 is configured to output and input audio signals. For example, the audio component 1310 includes a microphone (MIC) configured to receive an external audio signal when the terminal 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1302 provides an interface between the processing component 1302 and peripheral interface modules, such as a keyboard, a click wheel, buttons, and the like. The buttons may include but are not limited to, a home button, a volume button, a starting button, and a locking button.

The sensor component 1314 includes one or more sensors to provide status assessments of various aspects of the terminal 1300. For instance, the sensor component 1314 may detect an open/closed status of the terminal 1300, relative positioning of components, e.g., the display and the keypad, of the terminal 1300, a change in position of the terminal 1300 or a component of the terminal 1300, a presence or absence of user contact with the terminal 1300, an orientation or an acceleration/deceleration of the terminal 1300, and a change in temperature of the terminal 1300. The sensor component 1314 may include a proximity sensor configured to detect the presence of nearby objects without any physical contact. The sensor component 1314 may also include a photosensitive sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the terminal 1300 and other devices. The terminal 1300 may access a wireless network based on a communication standard, such as WiFi, 2G, 3G, or a combination thereof. In one example embodiment, the communication component 1316 receives a broadcast signal or broadcast associated information from an external broadcast management system via a broadcast channel. In one example embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the terminal 1300 may be implemented with one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components, for performing the above described methods.

In some embodiments, a non-transitory computer-readable storage medium storing thereon instructions can be used, the above instructions may be executed by the processor 1320 of the terminal 1300, for performing the above-described methods. For example, the non-transitory computer-readable storage medium may be a ROM, a random access memory (RAM), a CD-ROM, a magnetic tape, a floppy disc, an optical data storage device, and the like.

A non-transitory computer-readable storage medium, when instructions in the storage medium is executed by the processor of the terminal 1300, enables the terminal 1300 to perform a method for displaying a user interface, the method including: when a signal triggered by touching an identifier of a first program is received, starting a first application; when the folding display screen is in an open state, displaying a display area of the first application on a first screen area of the folding display screen; displaying a control area of the first application on a first partial area of a second screen area of the folding display screen; and displaying information of the second application on a second partial area of the second screen area.

The embodiments of the present disclosure also provide a computer-readable medium storing at least one instruction, the at least one instruction is loaded and executed by a processor to implement the method for displaying an interface in various embodiments as described above.

The embodiments of the present disclosure also provide a computer program product storing at least one instruction, the at least one instruction is loaded and executed by a processor to implement the method for displaying an interface in various embodiments as described above.

In one or more embodiments, the first screen area and the second screen area are connected by a third screen area; the control area includes a first control sub-area and a second control sub-area; and the second screen area sequentially displays the first control sub-area, the second partial area, and the second control sub-area along a length direction of the third screen area.

In one or more embodiments, the first application is an application of a virtual environment, a screen of the virtual environment is displayed in the display area, and the virtual environment includes at least one virtual object; a direction control identifier is displayed in the first control sub-area, and the direction control identifier is used to control a moving direction of the virtual object; and a function control identifier is displayed in the second control sub-area, and the function control identifier is used to control the behavior of the virtual object.

In one or more embodiments, the information of the second application includes an identifier of the second application, and the display module is further configured to, when a first touch signal triggered by touching an identifier of the second application is received, display a second user interface in the second partial area, the second user interface being a user interface of the second application.

In one or more embodiments, the information of the second application includes an identifier of the second application; and the display module is further configured to display the identifier of the second application covered by a mask on the second partial area; and when a second touch signal triggered by touching the second partial area is received, remove the mask, and display the identifier of the second application.

In one or more embodiments, the information of the second application includes push information of the second application; and the display module is further configured to, when a push message of the second application is received, display the push information on the second partial area, the push information including at least one of a message notification of the push message, a message preview of the push message, and a user interface of the second application.

In one or more embodiments, the display module is further configured to obtain a first startup moment of the first application; and determine an application that has run in a first time period before the first startup moment as the second application.

In one or more embodiments, the processing module is further configured to obtain exit moments of the applications that have run in the first time period before the first startup moment; calculate time intervals between the exit moments and the first startup moment; and sort the time intervals in an ascending order, and determine an application corresponding to the time interval sorted in a top preset position as the second application.

In one or more embodiments, the processing module is further configured to determine, among applications that have run in the terminal in a second time period, an application other than the first application as a candidate application; obtain a number of startups and/or a running time of the candidate application in the second time period; determine the candidate application whose number of startups and/or running time reaches a preset condition as a common application; and determine the common application as the second application.

In one or more embodiments, the processing module is further configured to, for any candidate application in the candidate applications, multiply the number of startups by a first weight value, and multiply the running time by a second weight value, to obtain a first score value of the candidate application; and sort the first score values in a descending order, and determine the candidate application corresponding to the first score value sorted in a top preset position as the common application.

It shall be understood that the term "plurality" mentioned herein is defined as two or more than two. The term "and/or" describes an association relationship of associated objects, and represents that there may be three relationships. For example, A and/or B may represent three situations including the single existence of A, the simultaneous existence of A and B, and the single existence of B. The symbol "/" generally represents that contextual objects are in an "or" relationship.

The above-mentioned serial numbers of the embodiments of the present disclosure are merely for the description, and do not represent the advantages and disadvantages of the embodiments.

The person skilled in the art may understand that all or part of the steps of implementing the above embodiments may be completed by hardware or may be completed by instructing a related hardware by program, and the program may be stored in a computer-readable storage medium. The storage medium mentioned above may be a read-only memory, a magnetic disk or an optical disk or the like.

The above description includes some of the embodiments of the present disclosure and is not intended to limit the present disclosure. Any modifications, equivalent substitutions, improvements, etc., which are within the spirit and principles of the present disclosure, should be included in the protection scope of the present disclosure.

What is claimed is:

1. A method for displaying a user interface comprising:
when a signal triggered by touching an identifier of a first program is received on a terminal having a folding display screen, starting a first application in the terminal;
when the folding display screen is in an open state, displaying a display area of the first application on a first screen area of the folding display screen;
displaying a control area of the first application on a first partial area of a second screen area of the folding display screen;
obtaining a first startup moment of the first application;
determining an application that has run in a first time period before the first startup moment as the second application; and
displaying information of a second application on a second partial area of the second screen area.

2. The method according to claim 1, wherein
the first screen area and the second screen area are connected by a third screen area;
wherein the control area comprises a first control sub-area and a second control sub-area; and
wherein the second screen area sequentially displays the first control sub-area, the second partial area, and the second control sub-area along a length direction of the third screen area.

3. The method according to claim 2, wherein
the first application is an application of a virtual environment, a screen of the virtual environment is displayed in the display area, and the virtual environment comprises at least one virtual object.

4. The method according to claim 2, further comprising:
displaying a direction control identifier in the first control sub-area, wherein the direction control identifier is used to control a moving direction of the virtual object; and
displaying a function control identifier in the second control sub-area, wherein the function control identifier is used to control behavior of the virtual object.

5. The method according to claim 2, wherein
the length direction refers to a direction along the longer edge of the third screen area.

6. The method according to claim 1, wherein the information of the second application comprises an identifier of the second application;
wherein the displaying the information of the second application on the second partial area of the second screen area comprises:
displaying the identifier of the second application covered by a mask on the second partial area; and
when a second touch signal triggered by touching the second partial area is received, removing the mask, and displaying the identifier of the second application.

7. The method according to claim 1, wherein
the information of the second application comprises push information of the second application; and
wherein the displaying the information of the second application on the second partial area of the second screen area comprises:
when a push message of the second application is received, displaying the push information on the second partial area, the push information comprising at least one of a message notification of the push message, a message preview of the push message, and a user interface of the second application.

8. The method according to claim 1, wherein
the determining the application that has run in the first time period before the first startup moment as the second application comprises:
obtaining exit moments of the applications that have run in the first time period before the first startup moment;
calculating time intervals between the exit moments and the first startup moment; and
sorting the time intervals in an ascending order, and determining an application corresponding to the time interval sorted in a top preset position as the second application.

9. The method according to claim 1, wherein
before displaying the information of the second application on the second partial area of the second screen area, the method further comprises:
determining, among applications that have run in the terminal in a second time period, applications other than the first application as candidate applications;
obtaining at least one of the following: a number of startups or a running time of the candidate applications in the second time period;
determining at least one of the following: the candidate application's number of startups reaches a preset condition as a common application or the candidate application's running time reaches a preset condition as a common application; and
determining the common application as the second application.

10. The method according to claim 9, wherein
the determining at least one of the following: the candidate application's number of startups reaches a preset condition as a common application or the candidate application's running time reaches a preset condition as a common application comprises:
for any candidate application in the candidate applications, multiplying the number of startups by a first weight value, and multiplying the running time by a second weight value, to obtain a first score value of the candidate application; and
sorting the first score values in a descending order, and determining the candidate application corresponding to the first score value sorted in a top preset position as the common application.

11. The method according to claim 1, wherein the information of the second application comprises an identifier of the second application; and
when a first touch signal triggered by touching the identifier of the second application is received, a second user interface is displayed in the second partial area, and the second user interface is a user interface of the second application.

12. A terminal having a folding display screen, comprising:
one or more processors; and
non-transitory tangible computer readable memory configured to store at least one instruction, and the instruction is loaded and executed by the one or more processors to perform acts comprising:
when a signal triggered by touching an identifier of a first program is received, starting a first application;
when the folding display screen is in an open state, displaying a display area of the first application on a first screen area of the folding display screen;
displaying a control area of the first application on a first partial area of a second screen area of the folding display screen;
obtaining a first startup moment of the first application;
determining an application that has run in a first time period before the first startup moment as the second application; and
displaying information of a second application on a second partial area of the second screen area.

13. The terminal according to claim 12, wherein
the first screen area and the second screen area are connected by a third screen area;
wherein the control area comprises a first control sub-area and a second control sub-area; and
wherein the second screen area sequentially displays the first control sub-area, the second partial area, and the second control sub-area along a length direction of the third screen area.

14. The terminal according to claim 13, wherein the first application is an application of a virtual environment, a screen of the virtual environment is displayed in the display area, and the virtual environment comprises at least one virtual object.

15. The terminal according to claim 13, further comprising:
displaying a direction control identifier in the first control sub-area, wherein the direction control identifier is used to control a moving direction of the virtual object; and
displaying a function control identifier in the second control sub-area, wherein the function control identifier is used to control behavior of the virtual object.

16. The terminal according to claim 12, wherein the information of the second application comprises an identifier of the second application;
wherein the displaying the information of the second application on the second partial area of the second screen area comprises:
displaying the identifier of the second application covered by a mask on the second partial area; and
when a second touch signal triggered by touching the second partial area is received, removing the mask, and displaying the identifier of the second application.

17. The terminal according to claim 12, wherein
the information of the second application comprises push information of the second application; and
wherein the displaying the information of the second application on the second partial area of the second screen area comprises:
when a push message of the second application is received, displaying the push information on the second partial area, the push information comprising at least one of a message notification of the push message, a message preview of the push message, and a user interface of the second application.

18. The terminal according to claim 12, wherein the determining the application that has run in the first time period before the first startup moment as the second application comprises:
obtaining exit moments of the applications that have run in the first time period before the first startup moment;
calculating time intervals between the exit moments and the first startup moment; and
sorting the time intervals in an ascending order, and determining an application corresponding to the time interval sorted in a top preset position as the second application.

19. A tangible, non-transitory computer-readable storage medium storing at least one instruction, applied to a terminal having a folding display screen, wherein the instruction is loaded and executed by a computing device on the terminal to implement:
    when a signal triggered by touching an identifier of a first program is received, starting a first application;
    when the folding display screen is in an open state, displaying a display area of the first application on a first screen area of the folding display screen;
    displaying a control area of the first application on a first partial area of a second screen area of the folding display screen;
    obtaining a first startup moment of the first application;
    determining an application that has run in a first time period before the first startup moment as the second application; and
    displaying information of a second application on a second partial area of the second screen area.

20. The non-transitory tangible computer-readable storage medium of claim 19, wherein the first application is an application of a virtual environment, a screen of the virtual environment is displayed in the display area, and the virtual environment comprises at least one virtual object, wherein the instructions further comprise:
    displaying a direction control identifier in the first control sub-area, wherein the direction control identifier is used to control a moving direction of the virtual object; and
    displaying a function control identifier in the second control sub-area, wherein the function control identifier is used to control behavior of the virtual object.

\* \* \* \* \*